United States Patent [19]
Kirsch et al.

[11] 3,914,383
[45] Oct. 21, 1975

[54] DY ZEOLITE HYDROCARBON CONVERSION CATALYST

[75] Inventors: Francis William Kirsch, Wayne; David S. Barmby, Media; John D. Potts, Springfield, all of Pa.

[73] Assignee: Sun Research and Development Co., Philadelphia, Pa.

[22] Filed: Aug. 18, 1972

[21] Appl. No.: 281,910

Related U.S. Application Data

[63] Continuation-in-part of Ser. No. 581,129, Aug. 25, 1966, abandoned, and a continuation-in-part of Ser. No. 715,998, March 26, 1968, Pat. No. 3,624,173, and a continuation-in-part of Ser. No. 716,190, March 26, 1968, and a continuation-in-part of Ser. No. 749,714, Aug. 2, 1968, and a continuation-in-part of Ser. No. 823,656, May 12, 1969, and a continuation-in-part of Ser. No. 830,687, June 5, 1969, Pat. No. 3,655,813, and a continuation-in-part of Ser. No. 840,110, June 16, 1969, abandoned, and a continuation-in-part of Ser. No. 34,209, May 1, 1970, Pat. No. 3,706,814, and a continuation-in-part of Ser. No. 114,061, Feb. 9, 1971, and a continuation-in-part of Ser. No. 211,040, Dec. 22, 1971.

[52] U.S. Cl.......... 423/328; 252/455 Z; 260/683.43
[51] Int. Cl........................ C01b 33/28; B01j 11/40
[58] Field of Search.......... 423/328, 329, 330, 118; 252/455 Z; 208/111, 120, 683.43

[56] References Cited
UNITED STATES PATENTS

| | | | |
|---|---|---|---|
| 3,251,902 | 5/1966 | Garwood et al. | 260/683.64 |
| 3,277,018 | 10/1966 | Plank et al. | 252/451 |
| 3,324,048 | 6/1967 | Plank et al. | 252/455 Z |
| 3,396,203 | 8/1968 | Bushick | 260/668 |
| 3,437,604 | 4/1969 | Michalko | 252/455 Z |
| 3,508,867 | 4/1970 | Frillette et al. | 423/328 |

*Primary Examiner*—C. Dees
*Attorney, Agent, or Firm*—George L. Church; J. Edward Hess; Barry A. Bisson

[57] ABSTRACT

A Dy-alumino-silicate catalyst, useful for hydrocarbon conversion reactions, is chemically characterized by the empirical formula $M_x(AlO_2)_x(SiO_2)_y \cdot (H_2O)_z$, where $x$, $y$ and $z$ are integers, the ratio x:y being usually from 1.0 to 0.2 and where at least 25% (and preferably more than 40%) of the negative charge associated with the aluminum of the alumino-silicate framework is satisfied by a cation of Dy or a cation of an oxide or a hydroxide of Dy. Preferably, upon ignition analysis the catalyst will evolve from 1 to 6 molecules of water (typically 1.5–2.5 molecules) for each atom of Dy in the catalyst. Typically the negative charge associated with the zeolite framework is not completely satisfied by cations containing Dy and the balance of cations necessary for electronic equivalency comprise $H^+$ or cations of metals, metal oxides or metal hydroxides. The zeolite also contains less than one alkali metal cation for every four atoms of aluminum in the framework. The zeolite can be amorphous, but preferably is at least partially crystalline and can adsorb benzene.

12 Claims, 2 Drawing Figures

DY ZEOLITE HYDROCARBON CONVERSION CATALYST

CROSS REFERENCES TO RELATED APPLICATIONS

This application is a continuation-in-part of all of the following applications:

| SERIAL NO. | FILING DATE | PATENT NO. | ISSUE DATE |
|---|---|---|---|
| 581,129 | 8-25-66 | (now abandoned) | |
| 715,998 | 3-26-68 | 3,624,173 | 11-30-71 |
| 716,190 | 3-26-68 | | |
| 749,714 | 8-2-68 | | |
| 823,656 | 5-12-69 | | |
| 830,687 | 6-5-69 | 3,655,813 | 4-11-72 |
| 840,110 | 6-16-69 | (now abandoned) | |
| 34,209 | 5-1-70 | 3,706,814 | 12-19-72 |
| 114,061 | 2-9-71 | | |
| 211,040 | 12-22-71 | | |

Dy-containing zeolites which can be utilized as catalysts in the subject process have also been described in Ser. No. 590,225 filed Oct. 28, 1966 of Ronald D. Bushick (now U.S. Pat. No. 3,396,203, issued Aug. 6, 1968), in application Ser. No. 749,739 filed Aug. 2, 1968 of Ronald D. Bushick (now U.S. Pat. No. 3,534,115, issued Oct. 13, 1970) and in application Ser. No. 749,932 filed Aug. 5, 1968 of Ronald D. Bushick and Alfred E. Hirschler (now U.S. Pat. No. 3,565,964, issued Feb. 23, 1971). These applications also disclose hydrocarbon conversion reactions which can be catalyzed by the Dy-zeolites. The Dy zeolites (which have a controlled range of water content) can also be useful in the hydrocarbon conversion reactions and separations disclosed in copending applications Ser. No. 207,870, filed Dec. 14, 1971 of John A. Hedge; Ser. No. 256,863, filed May 25, 1972 of John A. Hedge and Ser. No. 263,370, filed June 6, 1972 of Ronald I. Davis.

The disclosure of all of the above-cited applications is hereby incorporated in the present application.

BACKGROUND OF THE INVENTION

Although it is known to utilize crystalline aluminosilicate zeolites containing cations of lanthanum, cerium or of certain rare earth salt mixtures as hydrocarbon conversion catalysts (e.g., see U.S. Pat. Nos. 3,140,249 and 3,210,267), the art has failed to realize that incorporation of substantial quantities of dysprosium cations in an amorphous or crystalline alumino-silicate zeolite of controlled "water content" and low alkali metal content can be used to produce an adsorbent for aromatic hydrocarbons or a catalyst which is especially useful for hydrocarbon conversion reactions, and particularly conversions involving carbonium-ion mechanisms. Similarly, the art has failed to appreciate that a combination of such a Dy alumino-silicate catalyst with a hydrogenation catalyst can be especially useful for conversions involving catalytic contacting of hydrocarbons in the presence of hydrogen, such as aromatization of naphthenes or olefins, cyclizations, reforming, hydrocracking and hydroisomerization.

BRIEF SUMMARY OF THE INVENTION

Hydrocarbon conversion reactions, such as cracking, dehydrogenation, reforming, alkylation, dealkylation, cyclization and isomerization can be effected by contacting a hydrocarbon feed with a catalyst comprising an alumino-silicate zeolite containing cations of dysprosium, such as $Dy^{+3}$, $Dy(OH)^{+2}$, and $Dy(OH)_2^+$.

A Dy-alumino-silicate catalyst, useful for hydrocarbon conversion reactions, is chemically characterized by the empirical formula $M_x(AlO_2)_x(SiO_2)_y \cdot (H_2O)_z$, where $x$, $y$ and $z$ are integers, the ratio $x:y$ being usually from 1.0 to 0.2 and where at least 25% (and preferably more than 40%) of the negative charge associated with the aluminum of the alumino-silicate framework is satisfied by a cation of Dy or a cation of an oxide or a hydroxide of Dy. Preferably, upon ignition analysis the catalyst will evolve from 1 to 6 molecules of water (typically 1.5–2.5 molecules) for each atom of Dy in the catalyst. Typically the negative charge associated with the zeolite framework is not completely satisfied by cations containing Dy and the balance of cations necessary for electronic equivalency comprise $H^+$ or cations of metals, metal oxides or metal hydroxides. The zeolite also contains less than one alkali metal cation for every four atoms of aluminum in the framework. The zeolite can be amorphous, but preferably is at least partially crystalline and can adsorb benzene. Also effective as catalysts in such processes are novel catalysts comprising such dysprosium-containing zeolites which also contain magnesium cations, aluminum cations, silver cations, gadolinium cations, cations of the hydroxides or oxides of these metals or mixtures of two or more of such cations.

The preferred zeolite catalyst is crystalline, has the faujasite framework with an atomic ration Al/Si of 0.65 to 0.35 (e.g., Linde Type Y) and contains at least one $Dy(OH)_2^+$ cation for every 8 atoms of aluminum in the alumino-silicate framework. The zeolite can also be utilized as an adsorbent, as for separating aromatic hydrocarbons from less polar compounds. In conversions involving oxidative regeneration of this catalyst (or adsorbent), crystallinity can decrease, usually accompanied by a decrease in activity and/or selectivity. The resulting, more amorphous, zeolite can be effective as a catalyst, particularly at conversion temperatures which are greater than those required for the corresponding conversion with an equal weight of crystalline zeolite.

An especially useful hydrocarbon conversion reaction is the hydroisomerization of the $C_4$–$C_9$ paraffin hydrocarbons which are capable of conversion to more highly branched isomers, in order to obtain a more highly branched product with improved octane ratings. Another especially useful conversion is the alkylation of $C_6$–$C_{14}$ aromatic (or $C_7$–$C_{22}$ alkyl aromatic) hydrocarbons, or $C_2$–$C_9$ paraffin hydrocarbons, with olefin hydrocarbons. Another especially useful conversion is the isomerization of such polycyclic aromatic hydrocarbons as s-octahydrophenanthrene (s-OHP) to produce s-octahydroanthracene (s-OHA) and/or such aromatic hydrocarbons as 1-cyclohexyl-2-phenyl ethane, asymmetrical octahydrophenanthrene, 1,2,3,4-tetrahydroanthracene, 1,2,3,4-tetrahydrophenanthrene, anthracene, phenanthrene and tetralin. It is sometimes also advantageous to conduct such aromatic isomerization reactions in the presence of from 5 to 1500 psi of hydrogen.

FURTHER DESCRIPTION OF THE INVENTION

Paraffin-olefin alkylation activity can be a measure of the acid activity of a catalyst, and, therefore, indicative of the ability of the catalyst to catalyze typical carbonium-ion reactions such as cracking dealkylation, aromatic alkylation, polymerization, isomerization, etc. That is, a necessary, but not sufficient, condition for the catalytic alkylation of isobutane with a $C_3$–$C_9$ monoolefin is that the catalyst must have the ability to generate carbonium-ions (one further requirement for paraffin-olefin alkylation is good hydride transfer ability). By utilizing the liquid phase alkylation of i-butane with butene-2 as a test reaction, it has been found that a substantially anhydrous DyHY catalyst, prepared by activation of a crystalline $DyNH_4Y$ zeolite (obtained by Dy-cation exchange of highly ammonium-exchanged sodium Y zeolite) is an effective catalyst for hydrocarbon conversion reactions, especially those which are considered by the art to involve a carbonium-ion mechanism.

In the Dy alumino-silicate catalyst, at least 25% and, preferably, at least 40% of the electronegativity associated with the alumino-silicate framework is satisfied by cations of dysprosium or of its oxides or hydroxides. When the Dy catalyst contains less than one alkali metal cation (e.g., $Na^+$) for every 4 aluminum atoms in the alumino-silicate framework, the catalyst is especially useful for such hydrocarbon conversion reactions as isomerizing polycyclic aromatic hydrocarbons, paraffin-olefin alkylation and the cracking of gas oil. Preferably, the aluminosilicate zeolite is crystalline and is chemically characterized by the empirical formula 1a $M_x(AlO_2)_y \cdot (H_2O)_z$, where $x$, $y$ and $z$ are integers, the ratio $x/y$ being from 1.0 to 0.2 and where M is chosen from one of the following groups:

1. at least one $Dy^{+3}$ cation for every 12 atoms of aluminum in the alumino-silicate framework of said zeolite;
2. at least one cation of $Dy(OH)^{+2}$ for every 8 atoms of aluminum in the alumino-silicate framework of said zeolite;
3. at least one cation of $Dy(OH)_2^{+1}$ for every 4 atoms of aluminum in the alumino-silicate framework of said zeolite;
4. a combination of the members of at least two of the above groups;

wherein, if necessary, the balance of the cations for electronic equivalency of said framework comprises $H^+$ or cations of metals, metal oxides, or metal hydroxides, wherein there is less than one alkali metal cation for every four atoms of aluminum in the alumino-silicate zeolite, more preferably, less than one alkali metal cation for every ten atoms of aluminum, and wherein when said zeolite is analyzed by ignition at 1800°F., at least one molecule (preferably 1–6, typically 1.5–2.5 molecules) of water is obtained for each atom of Dy in said zeolite.

The Dy zeolite can contain as such additional cations, the cations of magnesium, aluminum, silver, nickel, zinc, cerium, gadolinium, lanthanum and mixtures of these cations. In such catalysts it is preferred that at least one such cation is present for every 20 atoms of aluminum in the alumino-silicate framework of said zeolite.

For most hydrocarbon conversions, the ratio $x/z$ (i.e., $AlO_2/H_2O$) in the empirical formula of the zeolite should be in the range of 0.25 to 2. If excess water is present, the zeolite should be activated by heating according to the procedure disclosed in the aforementioned applications of Kirsch, Barmby and Potts. If the zeolite is deficient in bound water, such water can be added, as by exposure to steam in air or nitrogen at a temperature below about 1150°F. (more preferred below 1100°F.).

As used herein, the term framework, in reference to the alumino-silicate portion of the zeolite (which can be crystalline or amorphous), excludes those aluminum ions which are in exchange positions and which are neutralizing some of the negative charge associated with the aluminum atoms in the alumino-silicate tetrahedra of the zeolite. Note that aluminum in the alumino-silicate framework can be either trigonal or tetrahedral.

Another type of empirical formula which can be used to characterize the novel Dy zeolite is where $a$, $b$, $c$, $d$, $e$, $n$, $m$, $x$, $y$ and $z$ are integers, the ratio $x/y$ being from 1.0 to 0.2, the sum $a + b + (3-e)c + d + e = x$, and $c$ is at least $x/12$, and where $[M_2]_b$ represents the balance of the cations necessary for electronic equivalency of the zeolite, $[M_1^+]_a$ is the alkali metal content, $a$ is in the range from 0 to $x/4$, and wherein ($e + z/c$) is at least 1.0 (preferably 1.0–6.0, typically 1.5–2.5).

Another type of expression is a type used in Ser. No. 211,040 to characterize a novel rare earth zeolite and expresses the composition in terms of mole ratios of oxides as wherein I represents the monovalent metal cations (including $NH_4^+$) and protons; II represents the divalent metal cations; III represents the trivalent metal cations; IV represents the tetravalent cations. For example, $a$ can have a value of from zero to 0.75; $b$ can have a value of from zero to 0.25; $c$ can have a value of from 0.25 to about 1; and $e$ can have a value of from 2 to 20. In Ser. No. 211,040 it was further provided that when $e$ has a value of from 2 to 3, the value of ($b + c = 0.75$ to 1 and $d = 0$; and with the proviso that when $e$ has a value of >3 to 4, the value of $cb + c + d$) = .6 to 1.0; and with the further proviso that when e has a value of > 4 to 20, the value of ($b + c + d$) = 0.25 to 1.0.

Typically the coefficient a is in the range of 0 to 0.1, $b$ is about 0, $c$ is in the range of 0.4 to 0.8 and $d$ is about 0. In a preferred zeolite (of the Y type) $e$ is about 4.7.

For example, in zeolites containing sodium, ammonium and protonic cations, the term $a(I_2O)$ can be expressed as $A_1(Na_2O): A_2 (NH_4)_2O : A_3(H_2O)$ and a preferred Dy zeolite can be expressed as where the sum of $A_2$ and $A_3$ is about 0.2. Preferably, $A_2$ is as small as possible and can be virtually 0, typically less than 0.005.

In said Ser. No. 211,040 a preferred class of rare earth zeolites (useful for paraffin-olefin alkylation) was disclosed as represented by the empirical formula $M_x(AlO_2)_x(SiO_2)_y(H_2O)_z$ where $f(Na):g(H):h(RE) = M_x$; where $x$, $y$ and $z$ are integers, RE is at least one cation of a rare earth metal, the ratio $x/y$ is in the range of 0.2 to 1.0, z is in the range of $0-2x$ and $f$, $g$ and $h$ are the percentage cation distributions of Na, H and RE, and wherein $f$ is in the range of about 0 to 20, $g$ is in the range of about 10 to 50 and $h$ is in the range of about 45–70, and the sum of $f$, $g$ and $h$ is about 100. In the present invention the rare earth metal can consist essentially of dysprosium. Preferably the ratio $x/y$ is in the range of 0.35–0.65 and when the zeolite is analyzed by ignition at 1800°F., from 1.0 to 6 molecules of water is obtained for each atom of dysprosium in said zeolite. Typically, the zeolite is at least 50% crystalline and can absorb benzene. In one embodiment the zeolite contains 100 percent to about 60 percent of its maximum OH exhibiting infrared absorption in the region of 3480 to 3670 cm.$^{-1}$.

For such reactions as reforming, aromatization, hydrogen transfer, hydrocracking and hydroisomerization, it is preferred that the catalyst have incorporated therewith from 0.05 to 25% (more preferably, 0.05 to 5%) of a hydrogenation catalyst component containing a hydrogen-active metal such as platinum, palladium, rhodium, rhenium, ruthenium, molybdenum, cobalt or nickel (or a chemical compound, as an oxide or sulfide, of such a metal). The hydrogen-active metal can also be incorporated on a carrier (as alpha-alumina, microporous silica, conventional amorphous silicaalumina cracking catalyst, or acid-exchanged clays, such as montmorillonites or kaolin). When the hydrogen-active metal component (or a chemical compound of the metal) is so incorporated on a carrier, it is preferred that the Dy catalyst be physically admixed therewith.

When the hydrocarbon conversion involves cyclization and/or aromatization, as with a feed of n-pentene, n-hexene, n-heptene or 1,4-dimethylnaphthalene, the cyclization conditions comprise a temperature in the range of 350°–850°F. and a pressure in the range of 0–750 p.s.i.g., preferably with the reactants maintained in the vapor or trickle phase. For aromatization and/or cyclization of a cracked naphtha, temperature in the range of 240°–600°F. is preferred at atmospheric pressure. For a hydrogen transfer reaction, to produce aromatics from naphthenes, a temperature in the range of 300°–500°F. at atmospheric pressure is preferred, as when cyclohexane and propylene are the feed hydrocarbons and the products are benzene plus propane.

For double-bond isomerization, such as for the conversion of 2-ethyl-1-butene to cis and trans 3-methyl-2-pentene, or the conversion of pentene-1 to pentene-2, a temperature in the range of 70°–400°F. and pressures from 0–75 p.s.i.g. are preferred, with the lower temperatures and higher pressures most preferred in order to reduce cracking.

For isomerization and/or transalkylation of alkyl benzenes, such as converting meta-xylene to ortho and para-xylene, the hydrocarbon reactant can be either in liquid or vapor phase at a temperature in the range above about 60°C. and below cracking temperature. The preferred temperature range for xylene isomerization is 150°–350°C. and preferably in the presence of added hydrogen (e.g., 5–75 psi).

When the primary conversion reaction is cracking, a temperature in the range of 800°–1100°F. is preferred for a gas oil feed, preferably at atmospheric or slightly elevated pressure, although pressures as low as 1 mm. Hb. and as high as 1200 p.s.i.g. can be utilized in such cracking reactions. When the predominant reaction is hydrocracking, our preferred hydrogenactive metal is selected from Group VIb, VIII, and more preferably comprises Ni, Mo, Co, Pd or Pt. The preferred hydrogen pressure is in the range of 500–5000 psi at conversion temperatures from 650°–1100°F.

For paraffin-olefin alkylation, the preferred process conditions with a $C_3$–$C_9$ feed olefin are those of the aforementioned patent applications of Kirsch, Barmby and Potts. Generally, these involve a. contacting $C_3$–$C_9$ monoolefin with $C_4$–$C_6$ isoparaffin and with a substantially anhydrous Dy zeolite catalyst at a temperature below the critical temperature of the lowest boiling hydrocarbon reactant and at a pressure such that each of the reactants is in liquid phase, and, b. stopping such contacting after substantial alkylation has occurred but before the weight rate of production of unsaturated hydrocarbon becomes greater than the weight rate of production of saturated hydrocarbon.

Preferably, the feed olefin and feed paraffin are admixed prior to contact with the catalyst and the concentration of unreacted olefin is kept sufficiently low that predominantly saturated paraffin-olefin alkylation products are obtained rather than unsaturated products. This concentration is preferably less than seven, more preferably less than 12 mole percent, based on the total paraffin content of the reaction mixture. Also preferred is the use of a halide adjuvant (as HCl, $CCl_4$ and the $C_1$–$C_6$ monochloro paraffins) containing bromine, chlorine or fluorine, to increase the yield of liquid paraffin based on the olefin charged. Also preferred is a temperature in the range of 25°–120°C. and a mean residence time of the reaction mixture with the catalyst in the range of 0.05 to 0.5 hours per (gram of catalyst per gram of hydrocarbon in the reaction mixture). When the feed olefin comprises ethylene, conditions shown in U.S. Pat. No. 3,251,902 can be used to produce a liquid product; however, this liquid product is generally less preferred as a component of gasoline than are the highly branched liquid paraffin hydrocarbons which are produced by the aforementioned process of the Kirsch, Barmby and Potts applications.

For the isomerization of such polycyclic aromatic hydrocarbons as s-OHA to its isomer s-OHP, or s-OHP to its isomer s-OHA, the preferred conditions include a temperature above 80°C. and below cracking temperature and are shown in the aforementioned U.S. Pat. No. 3,396,203 of Ronald D. Bushick of Aug. 6, 1968. This Bushick patent also shows the preparation of a novel composition comprising an acidic Dy alumino-silicate catalyst and from 0.5 to 5% of a hydrogenation catalyst. Preferably, the hydrogenation catalyst is selected from the group consisting of platinum, palladium, nickel, nickel oxide, nickel sulfide, molybdenum oxide, molybdenum sulfide, cobalt oxide, palladium oxide and mixtures thereof. The hydrogenation catalyst can be physically admixed with the acidic alumino-silicate, or have been incorporated into the alumino-silicate by salt impregnation or by ion exchange. When the salt has been introduced into the alumino-silicate catalyst by ion exchange, it is preferred that the hydrogenation catalyst be reduced, as with hydrogen, prior to contact of the catalyst with the hydrocarbon feed. Also preferred is a process for the isomerization of polycyclic aromatic hydrocarbons, such as s-OHA or s-OHP, wherein the Dy catalyst/hydrogenation catalyst combination and from 25–1000 p.s.i.g. of hydrogen are present in the reactor. The added hydrogen aids in maintaining the activity of the isomerization catalyst combination, and can be recycled at rates up to 10,000 scf/bbl of feed. The LHSV is preferably in the range of 0.25–5.0 volumes of feed per volume of catalyst per hour. Such added hydrogen is also sometimes advantageous when no such hydrogenation catalyst is present with the Dy catalyst.

In any of the above-noted reactions, if the catalyst activity appreciably decreases during the course of the reaction, the catalyst may be separated from the hydrocarbon reactants and regenerated, as by purging with ammonia or burning in air. After such purging or burning, water can be added to the catalyst, as by exposure to hydrogen or to steam in air or nitrogen. When a hydrogen-active metal is incorporated into the zeolite catalyst, it is sometimes advantageous to reduce the regenerated combination with hydrogen, preferably at 250° to 800°F., prior to introduction of the hydrocarbonaceous feed.

When the primary hydrocarbon conversion is a hydroisomerization or a reforming reaction, the preferred conditions include a hydrogen pressure of at least 25 p.s.i.g and temperatures from 500° to 700°F., although the conversion can be effected in the range of 225°–1000°F., at total pressures in the range of 0–5000 p.s.i.g. and hydrogen pressures in the range of 0.5–4000 p.s.i.g. For the hydroisomerization of $C_5$–$C_9$ paraffins, the preferred catalyst combination will contain from 0.1 to 2 percent of Pt, Pd or Re (or a mixture thereof) or from 1 to 10% of Ni.

Typical feeds and reaction conditions which are effective when utilizing the Dy catalyst, particularly when combined with a hydrogenation catalyst, for hydroisomerization or reforming are those in the following U.S. Pat. Nos, 3,834,439; 2,970,968; 2,971,904; 2,983,670; 3,114,695; 3,122,494; 3,132,089; 3,140,253; 3,146,279; 3,190,939; 3,197,398; 3,201,356; and 3,236,762.

In conversion processes utilizing the Dy catalyst, whether alone or in combination with a hydrogenation catalyst, halide adjuvants containing chlorine, fluorine or bromine can frequently be used to increase the degree of conversion. Preferred adjuvants include $CCl_4$, HCl, $AlBr_3$, $BF_3$, HF and the $C_1$–$C_6$ chlorohydrocarbons.

DESCRIPTION OF THE DRAWINGS

FIGS. 1, 2 and 3 illustrate the three basic sections which comprise a continuous stirred reactor system which can be used to produce an olefin-paraffin alkylate using an acidic Dyzeolite catalyst and the process of the aforementioned U.S. Pat. applications Ser. No. 581,129 and Ser. No. 716,190.

Figure 1:
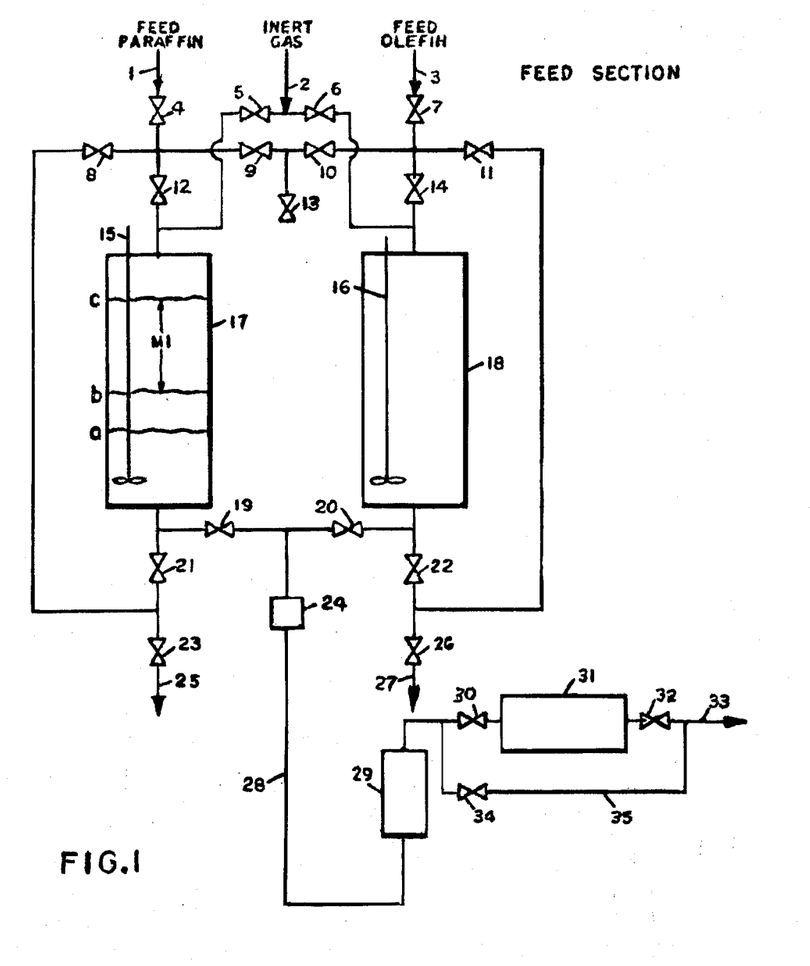
FIG. 1 illustrates the feed section, FIG. 2, the reactor-section.

In FIG. 1, the valving arrangement at the top of the mixing vessels 17 and 18 allows feed paraffin 1 or feed olefin 3 to be placed in either vessel 17 or vessel 18 from either the top or the bottom of the vessel. For example, paraffin can be introduced through the bottom of vessel 17 by closing valves 9, 12, 19 and 23 and opening valves 4, 8 and 21. Then, feed olefin 3 is transported to vessel 17 by closing valves 4, 11, 12, 14, 19 and 23 and opening valves 7, 8, 9, 10 and 21. Alternately, the mixing of the incoming feed olefin and feed paraffin can be effected by means of an inline mixer; however, for precise control of the reactant proportions and to insure intimate admixing of paraffin admixed with olefin be maintained in a stirring mixing vessel as vessels 17 and 18.

Similarly, by sequencing the position of the valves, the feed paraffin and the feed olefin can be introduced in any desired pattern. One sequence of placing feed paraffin and feed olefin in vessel 17 is to allow feed paraffin to enter vessel 17 to a level a. Sufficient feed olefin is then brought into vessel 17 to produce a volume of paraffin-olefin admixture represented by level b. The remainder of the required paraffin feed is added to vessel 17 until the level of the total feed mixture is at c. Such a sequence of paraffin-olefin-paraffin addition allows for better internal mixing of the reactants in vessel 17 (in addition, uniform mixing is insured by mixing devices 15, 16, such as, turbine blade rotary mixers). We have also found that additional mixing can be accomplished by bringing some or all of the inert gas into the bottom of the mixing vessel as through valve 21, rather than into the top of the vessel, as through valve 12.

It is generally preferable to introduce feed components to the mixing vessels in a number of alternate portions (unless the feed components are simultaneously proportioned into an inline mixer) to insure uniform mixing. Similarly, sequencing of valves can be used to fill vessel 18 while the mixture in vessel 17 is being fed to the reactor 43 (of FIG. 2). In order to use vessel 17 regardless of whether vessel 18 is being filled or not, pressure as by inert gas 2 (e.g., nitrogen) is imposed upon the liquid in vessel 17, as by closing valves 12, 19 and 21 and opening valve 5. Normally the nitrogen head is allowed to build up until the pressure in the mixing vessel is about 50 p.s.i. less than the pressure in the reactor 43.

Figure 2:
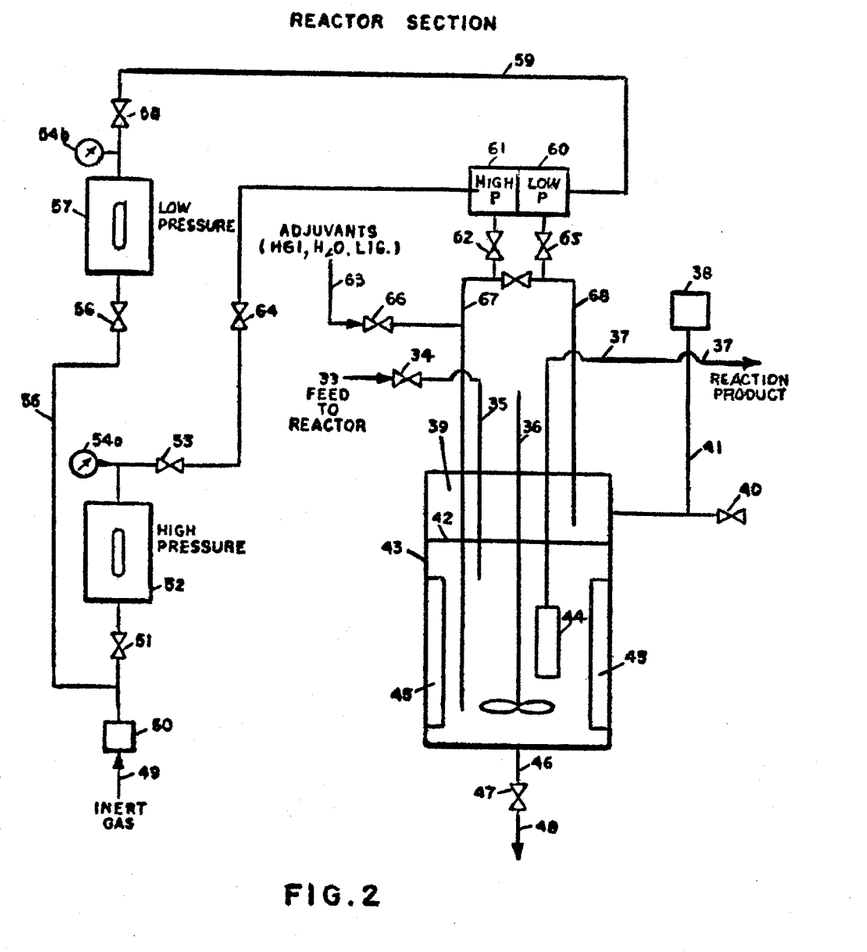

In order to allow a mixed paraffin-olefin feed to enter the reactor 43, the nitrogen head is imposed upon vessel 17 and valve 19 is opened. A constant head pressure on vessel 17 allows the pump 31 to pump the mixed feed through line 33 to the reactor at a constant rate.

When valve 19 is open, the feed mixture passes through a microfilter 24 (which protects the pump and meters from damage caused by foreign particles), then through a high pressure rotometer 29 (which serves as a flow indicator). The feed can then enter the pump 31 when valve 30 is open and, when valve 32 is open and 34 closed, the feed is pumped into the reactor 43. In the event of a pump failure, valve 30 and valve 32 may be closed, needle valve 34 opened and the nitrogen head increased sufficiently to allow the feed to flow through line 35 to line 33 and, thence to the reactor 43.

FIG. 2 illustrates the reactor section, comprising a continuous stirred reactor vessel and the associated lines and valving required for introducing feed, removing reaction products, and for operation of the differential pressure cell which is used for liquid level control. The reactor also contains heat transfer and control means (as a water jacket and electrical heaters, not shown) for maintaining the desired reaction temperature. The paraffin-olefin feed from line 33 enters the reactor 43 through valve 34 and line 35. To insure maximum olefin dilution, we prefer that the liquid feed be allowed to enter the reactor 43 below the reactor liquid level 42 and in the vicinity of the mixing means 36. Havlide adjuvants such as $CCl_4$ and/or t-butyl chloride can also be metered into the paraffin-olefin feed through an additional line, 34a, entering valve 34.

The liquid level is controlled by a differential pressure cell hereinafter DP cell, having a high pressure section 61 and a low pressure section 60, the differential pressure being in the range of 5–50 inches of water column. Inert gas 49 enters the DP cell through an in-line filter 50 from which it diverges through meter 52 to the high pressure section 61 and through meter 57 to the low pressure section 60. That is, for the high pressure section, valve 51 is open allowing the inert gas stream to flow through the high pressure meter 52 through open valve needle 53 and valve 64 into the high pressure side 61 of the DP cell, then through valve 62 into a line 67 which leads below the liquid level 42 in the reactor. Pressure gauges, 54a and 54b, indicate the pressure in the high pressure side and the lower pressure side, respectively. Other pressure gauges, thermometers, and analytical devices, can be advantageously incorporated into the three sections comprising the apparatus of FIGS. 1, 2 and 3; however, for simplicity such devices are not shown in the figures.

The inert gas can also be diverted through valve 56 to the low pressure meter 57 through needle valve 58 to the low pressure side 60 of the DP cell and then through valve 63 and line 68 to the vapor space above the liquid level 42 in the reactor. In operation, the DP cell senses a differential pressure which is equal to the height of liquid through which the inert gas from the higher pressure side of the cell must travel from the bottom of line 67 (which must be below the liquid level) to the vapor space 39. The difference between the pressure of the high side 61 and the pressure of the low side 60 of the DP cell is equal to the pressure required to push a bubble of gas through the height of the liquid. Since the DP cell measures the mass of a column of fluid (pressure) and not the volume, its measurement is independent of temperature and, although at a given temperature the actual level of the liquid will vary somewhat, the mass of the volume of liquid above the opening line 67 can be maintained at a constant value regardless of the temperature and pressure of the reactor.

The nitrogen (or other inert gas) which is introduced through the DP cell can be vented through a valve system 40, which can consist of an Annin control valve (a spline-type, highly sensitive metering device) and a block valve ahead of the Annin valve. Preferably, the outlet gas is passed through a stainless steel microfilter (not shown) to prevent inadvertent plugging of the control valve by entrained catalyst. The Annin valve can be actuated by a pressure transmitter (and gas meter) 38 in order to maintain a constant pressure in the vapor space of the reactor.

Catalyst-free reaction mixture is removed from the reactor via line 37 through valve system 69 (which can consist of an Annin valve and a hand-block valve ahead of the Annin valve). The liquid reaction mixture is separated from the suspended catalyst particles by means of a submerged screen 44 and is withdrawn from the reactor through line 37. Although screen plugging is not a frequent occurrence, if plugging occurs the screen can be back-flushed with nitrogen. This nitrogen back-flush can enter the reactor through line 37 and the excess nitrogen vented through valve system 40 in order that the reactor pressure is maintained constant. This flushing can be effected while the catalyst particles are maintained in suspension and the reaction mixture is maintained in contact with the catalyst particles. In the event that catalyst must be added or removed from the reactor, it may be accomplished through line 48, flush valve 47 and line 46. Similarly, the entire contents of the reactor can be drained through the flush valve 47, if the reaction mixture becomes contaminated or if for any other reason it is desired to drain the reactor contents. For example, if scale builds up on the reactor baffles 45, the reaction mixture can be dumped by opening valve 47, then cleaning materials can be pumped into (and removed from) the reactor through the same valves and lines.

The gases removed via valve 40 can be sent to a gas meter (and pressure transmitter) 38 which can also contain devices for chemical analysis or sampling. For example, the gases so removed can contain HCl, from the halide adjuvant. The HCl concentration in the vapor space is preferably maintained at a constant partial pressure, as by adjusting the quantity of adjuvant which enters the reactor via line 65, valve 66 and line 67. Such adjuvants can also be introduced into the reactor if they are directly added to the paraffin-olefin feed in the mixing vessels 17 and 18. Alkylate yield can be increased and catalyst life prolonged by addition of anhydrous HCl to the reactor at rates in the order of 0.001 to 0.25 moles per mole of olefin charged. Preferably, such HCl addition is regulated such that the concentration of HCl gas in the vapor space 39 above the liquid level 42 in the reactor 43 is maintained at from 0.25 to 25% (more preferably, less than 10%) of the total volume of gas in the vapor space. That is, the partial pressure of the HCl is maintained at from 0.25 to 25% of the total pressure. Thus, the rate of HCl addition depends, primarily, on the volume of the vapor space (which can be adjusted by means of the liquid level control), the temperature, the total pressure and the rate at which the total gases are flowed (e.g., recycled) through the vapor space.

Figure 3:
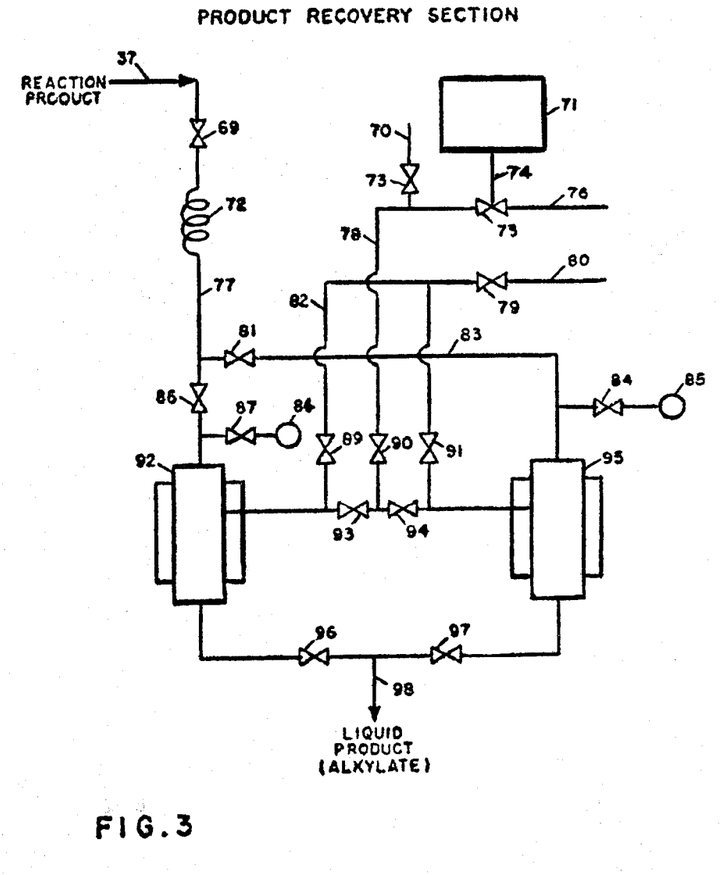
FIG. 3, the recovery section.

The catalyst-free liquid reaction product (comprising $C_5^+$ "alkylate", unreacted feed isoparaffin, some $C_5$-paraffin product and, usually, a small amount of unreacted feed olefin) which is removed from the reactor via line 37, passes through valve 69 (where the pressure is reduced from reactor pressure to 25 p.s.i.g. or less) and to condenser 72. The condensed liquid and non-condensed gas (e.g., feed isoparaffin) and inert gas (e.g., nitrogen) pass through valve 86 into vessel 92 or, alternately, through valve 81 to vessel 95. We prefer to have two such collector vessels in order that product can be collected in one vessel while product is removed from the other vessel. The liquid product removed from these vessels can be transported to product storage tanks or to a means for blending the alkylate with other gasoline components in order to make a blended gasoline product which can be transported to a stabilizer and then to storage area or to tank trucks, etc.

In the product recovery section illustrated in FIG. 3, the liquid produced by condensation of gaseous products in condenser 72 and uncondensed gases pass through line 77 and valve 86 (valve 81 is closed) and enter vessel 92, which is maintained at a temperature and pressure such that liquid alkylate can be removed via valve 96 through line 98 (valve 97 is closed) to tank trucks, a blending area, storage tanks, etc. Uncondensed gases (which consist primarily of unreacted feed isoparaffin) leave vessel 92 via valves 93, 90 and 74 (valves 94, 89 and 73 being closed) and can be passed to means for gas purification and separation 71 or, under some conditions, can be recycled to the reactor or to the mixing vessels via line 76, or via valve 73 and line 70. Minor amounts of the halide promoter which may be present in the reaction product can be removed as by means of an adsorbent which can be between valve 69 and the condenser 72 or at any other appropriate location in the product recovery section. When some or all of the halide promoter is a readily distillable gas such as HCl or methyl chloride, such gas can be removed from the reaction product by an intermediate condensation or distillation.

Adjuvants, such as $CCl_4$ and/or tertiary butyl chloride, can be added directly to the reactor as by line 33, valve 34 and line 35, or can be added to the one of the feed components, such as the isoparaffin, or can be added to the paraffin-olefin mixture in the mixing vessel 17 or 18; however, in the event that the promoter can react with the microfilter 24, or cause corrosion in the pump 31, it is preferred that the adjuvant be added at some point after the pump as by line 65, valve 66 and line 67 (the high pressure side of the DP cell), thus the promoter becomes dispersed in the flowing nitrogen from the high pressure side of the DP cell and passes into the reactor below the liquid level and bubbles up through the reactor contents.

ILLUSTRATIVE EXAMPLES

In the following examples, Example I shows the preparation of a preferred embodiment of the Dy catalyt and Example II shows the incorporation therewith of a Pt-hydrogenation catalyst. Example III shows continuous paraffin-olefin alkylation with the Dy zeolite catalyst of Example I. Example IV shows the importance of activation temperature in insuring the correct "water" content for catalytic activity.

EXAMPLE I

About 500 g. of NaY zeolite was exchanged, filtered and washed for 16 cycles with aqueous $NH_4Cl$ utilizing the procedures disclosed in the aforementioned U.S. application, Ser. No. 581,129. The resulting $Nh_4Y$ zeolite was similarly exchanged for 16 cycles with aqueous dysprosium nitrate. The aqueous dysprosium nitrate contained 11.8 g./l. $Dy(NO_3)_3.5H_2$(molecule weight, 438.6) and had a pH in the range of 4.3–4.7 (in making such solutions, the pH is commonly adjusted to about 4.5, if necessary, with $HNO_3$ or $NH_4OH$).

The resulting Dy-exchanged $NH_4$-exchanged zeolite was washed free of nitrate and unexchanged dysprosium ions, with distilled water, and dried in an oven at about 120° to produce a $DyNH_4Y$ zeolite. The zeolite was activated by heating slowly in a stream of helium to 400°C. to remove water and decompose the bulk of any remaining ammonium ions. This activation utilized the procedures disclosed in the aforementioned U.S. Ser. No. 581,129. The $DyNH_4Y$ zeolite before activation had the following analysis:

0.94 wt. % Na
13.60 wt. % Dy
1.79 wt. % N
23.31 % loss on Ignition

The base sodium zeolite, before exchange, analyzed 9.47% Na; 21.85% $Al_2O_3$; 63.17% $SiO_2$ and had a 25.43% loss on ignition. The resulting substantially anhydrous DyHY zeolite was crystalline and capable of adsorbing benzene. The weight loss upon ignition analysis at 1800°C., of the activated zeolite was 3.72%. The base zeolite can be reported on a cationic basis by the formula $0.09Na_2O:0.29(NH_4)_2O:0.05H_2O:0.57Dy_{2/3}O:Al_2O_3:4.93SiO_2$

EXAMPLE II

A solution of $Pt(NH_3)_2Cl_2$ in water was added dropwise with stirring to a dilute aqueous suspension of the dried $DyNH_4Y$ zeolite of Example I at 55°C. The amount of $Pt(NH_3)_2Cl_2$ used was equivalent to 0.5% Pt in the activated catalyst. After the Pt salt addition was complete (about 1 hr.), the solution was stirred at 55°C. for 30 minutes, filtered, and the catalyst combination washed with distilled water until the washings were free of chloride ion. The catalyst combination was dried at 120°C., heated to 400°C. in a stream of dry air and then reduced at 400°C. in the reactor in a flowing stream of $H_2$ for one hour. This catalyst combination is useful for the catalytic conversion of s-OHP at 200°C. under the conditions taught in U.S. Pat. No. 3,396,203 and is also useful for the conversion of s-OHP when there is also present in the reaction zone from 5–75 psi of hydrogen.

EXAMPLE III

In the apparatus of FIGS. 1, 2 and 3, a liquid mixture of 36 volumes of isobutane and 1 volume of butene-2 was fed, from the mixing section, and continuously contacted, in the reactor, in the presence of a halide adjuvant, withe the helium activated DyHY catalyst of Example I. The liquid level in the reactor was maintained constant by the DP cell so that the concentration of the catalyst in the reaction mixture was about 10 weight percent. The total initial reactor charge was 2500 cc at 25°C. and the total internal volume of the reactor was 3700 cc.

The feed rate and the rate of withdrawal of catalyst-free reaction mixture were continuous and controlled, such that the mean retention time was 0.3 hour per gram of hydrocarbon per gram of catalyst. The catalyst was maintained primarily in suspension by continuous stirring.

The halide adjuvant was 0.14 g. t-butyl chloride and 0.23 g. $CCl_4$ per gram of olefin charged. The temperature in the reactor was maintained in the range of 80°–100°C. and the pressure was maintained at 25–50 psi above autogenous at the temperature (the hydrocarbon being maintained primarily in the liquid phase). The nitrogen flow in the high pressure side of the DP cell was 0.075 liters/minute and in the low pressure side 0.350 l/m. (or a total flow of 0.425 l/m of $N_2$). Anhydrous HCl was added to the vapor space at an average rate equivalent to 0.25 moles HCl/mole of olefin charged. The HCl concentration was maintained in the vapor space in an intermittent manner by adding HCl for 30 minutes at a rate of about 0.1 l./m., then no further HCl was introduced for 90 minutes. Such cycles of 30 minutes of HCl introduction in every 120 minute period were continued throughout the run.

The $C_5^+$paraffin product recovered (continuously) for the first 39 hours of the run, from the so-withdrawn catalyst-free reaction mixture ranged from 160–236 wt. % (loss of the run being 200–210) based on the weight of olefin charged. The proportion of 2,2,4-trimethylpentane ranged from 23–33.6 mole percent of the trimethylpentane fraction, and relatively constant (most of the run being 25–29%), indicating a continuing self-alkylation function of the catalyst. The total trimethylpentane content of the $C_8$ fraction of the liquid product was relatively constant at about 88 to 91 mole percent of the $C_8$ fraction of the continuously produced alkylate. $C_5^+$ unsaturates in the liquid product ranged from 0.1 to 0.4 wt. %. The "total $C_5^+$ alkylate (60$^+$%, $C_8$)" produced in the first 39 hours per gram of activated DyHY catalyst was 9.95 g. For purposes of evaluation of catalysts in such a continuous alkylation process, the total yield is computed for the length of time that the run produced $C_5^+$ liquid alkylate containing at least 60% of $C_8$ paraffins, in the present application such a total or integrated yield is referred to as "total $C_5^+$ liquid alkylate (60%$^+C_8$)".

Alkylate yield maxima as high as 230 to 265 wt. % olefin charged can be obtained in runs similar to that described above. Although theoretical yield is 204 wt. %, self-alkylation and cracking of isobutane-derived products can increase the observed yields.

EXAMPLE IV

A cerium-ammonium type Y zeolite and a dysprosium-ammonium type Y zeolitewwere made by exchange in a manner similar to that of Example I.

The zeolites were then activated in air at a temperature of 1100°F. The so activated zeolites were then exposed to steam (in air) at 1400°F. (760°C.).

Table I presents a comparison of the water/rare earth ratio for the ammonium-cerium catalyst and the ammonium-dysprosium catalyst. The cerium catalyst was included to present the dysprosium data in perspective with Ser. No. 716,190. The cerium catalyst exhibits a reasonable water/cerium ratio when factors such as temperature and steaming are considered. The dysprosium catalyst relative to the cerium catalyst also exhibits a reasonable water/dysprosium ratio. Therefore, it may be concluded that steaming at 1400°F. did not increase the water content of a rare-earth zeolite catalyst over that which would be obtained by air activation at 1112°F. Approximately a 10% reduction in crystallinity index was noted after steaming at 1400°F.

Table II presents the analytical data for the two catalyts.

Table III presents analytical data for the base zeolites from which the two catalysts were prepared.

TABLE I

DYSPROSIUM AND CERIUM CATALYSTS
(Air activated 2h/1112°F, then steam activated 9h/1400°F)

| Catalyst No. | Activation | $H_2O$/Re Ratio* | Ignition Loss (Wt.%) |
|---|---|---|---|
| Ammonium-Cerium-Y | (16–16) | | |
| 131FX3-1- 1L1 | 2h/1112°F/Air | 0.9123 | |
| - 1L1A | 5h/1400°F/Air-Steam | 0.7696 | |
| - 1L1B | 9h/1400°F/Air-Steam | 0.8861 | |
| Ammonium-Dysprosium-Y | (16–16) | | |
| 119FX15-6- 1L1 | 2h/1112°F/Air | 1.3320 | 2.54 |
| - 1L1A | 5h/1400°F/Air-Steam | 0.9408 | 1.79 |
| - 1L1B | 9h/1400°F/Air-Steam | 0.8481 | 1.67 |

$A_1(Na_2O):A_2[(NH_4)_2)O]:A_3(H_2O):c(Dy_{2/3}O):Al_2O_3:e(SiO_2)$

Coefficients in Above Formula

| | $A_1$ | $A_2$ | $A_3$ | c | e |
|---|---|---|---|---|---|
| Cerium Catalyst | | | | | |
| 131 FX3-1- 1 | 0.0574 | 0.1755 | 0.0884 | 0.6786 | 4.8399 |
| 131 FX3-1- 1L1 | 0.0568 | 0.0023 | 0.2442 | 0.6970 | 4.8399 |
| - 1L1A | 0.0568 | 0.0084 | 0.2438 | 0.6895 | 4.8399 |
| - 1L1B | 0.0534 | 0.0041 | 0.2573 | 0.6854 | 4.8399 |
| Dysprosium Catalyst | | | | | |
| 119FX15-6- 1 | 0.0777 | 0.2111 | 0.0740 | 0.6367 | 4.7123 |
| 119FX15-6- 1L1 | 0.0784 | 0.0067 | 0.2838 | 0.6306 | 4.7123 |
| - 1L1A | 0.0826 | 0.0042 | 0.2852 | 0.6277 | 4.7123 |
| - 1L1B | 0.0812 | 0.0086 | 0.2821 | 0.6281 | 4.7123 |

*Calculated as in application Serial No. 716,190; see also pages B24 to B39 of ACS Petroleum Division Preprints for Los Angeles, California Meeting March 28–April 2, 1971. Note that $A_3$ is a calculation (by electronic balance) of proton content, which is reported as water. The $H_2O$/Re ratio is calculated from "excess" water found by ignition analysis and does not include the protons reported as water in $A_3$. Note that on an electronic basis the cationic formula of the zeolite remains about the same during activation, namely $0.08Na_40:0.01(NH_4)_20:0.28H_4O:0.63Dy_{2/3}O$

TABLE II

DYSPROSIUM AND CERIUM CATALYSTS

| Catalyst No. | **Equil. Zeolite (wt. %) Na | N | RE* | Ignition Loss Activated | Equil.** | CI*** |
|---|---|---|---|---|---|---|
| Cerium Catalyst | | | | | | |
| 131FX3-1-1 | 0.44 | 0.79 | 10.57 | — | 26.04 | 48 |
| 131FX3-1-1L1 | 0.43 | 0.01 | 10.72 | 1.69 | 25.55 | 47 |
| -1L1A | 0.46 | 0.04 | 11.01 | 1.49 | 22.76 | 41 |
| -1L1B | 0.42 | 0.02 | 10.97 | 1.64 | 22.54 | 43 |
| Dysprosium Catalyst | | | | | | |
| 119FX15-6-1 | 0.58 | 0.96 | 11.19 | — | 26.74 | 49 |
| 119FX15-6-1L1 | 0.58 | 0.03 | 10.99 | 2.54 | 25.68 | 46 |
| -1L1A | 0.64 | 0.02 | 11.45 | 1.79 | 22.16 | 42 |
| -1L1B | 0.63 | 0.04 | 11.49 | 1.67 | 21.97 | 43 |

*RE is the indicated rare earth (i.e., Dy or Ce)
**Equil. is the zeolite when equilibrated with saturated air at room temperature for 24 hours.
***CI is the crystallinity index, as determined by X-ray diffraction.

TABLE III

Analysis of Base Zeolite Used for Ammonium-Cerium Y
Wt.%, as Analyzed Basis

| | |
|---|---|
| 48.56, 46.70 | $SiO_2$ |
| 16.44, 16.96 | $Al_2O_3$ |
| 25.92 | Ignition loss |
| 7.03, 7.45 | Na |

Analysis of Base Zeolite Used for Ammonium-Dysprosium Y

| | |
|---|---|
| 45.98, 46.1 | $SiO_2$ |
| 16.65, | $Al_2O_3$ |
| 6.44 | Na |
| 24.89 | LOI |

The invention claimed is:

1. A Dy alumino-silicate zeolite which is chemically characterized by the empirical formula $M_x(AlO_2)_x(SiO_2)_y \cdot (H_2O)_z$, where $x$, $y$ and $z$ are integers, the ratio x/y being from 1.0 to 0.2 and where M is chosen from one of the following groups:
   a. at least one $Dy^{+3}$ cation for every 12 atoms of aluminum in the alumino-silicate framework of said zeolite;
   b. at least one cation of $Dy(OH)^{+2}$ for every eight atoms of aluminum in the alumino-silicate framework of said zoelite;
   c. at least one cation of $Dy(OH)_2^{+1}$ for every four atoms of aluminum in the alumino-silicate framework of said zeolite; or
   d. a combination of the members of at least two of the above groups; and wherein in said term "M", the balance of the cations, if necessary for electronic equivalency of the zeolite, comprise $H^+$ or cations of other metals, metal oxides or metal hydroxides and wherein there is less than one alkali metal cation for every four atoms of aluminum in the alumino-silicate portion of said zeolite and wherein said zeolite has not been contacted with steam at a temperature above 1150°F and when said zeolite is analyzed by ignition at 1800°F., at least 1.0 molecules of water is obtained for each atom of Dy in said zeolite, said zeolite being useful as a catalyst for hydrocarbon conversion reactions.

2. The zeolite of claim 1 wherein said zeolite is at least 50% crystalline, said crystalline portion being capable of adsorbing benzene, and wherein at least 50% of the electronegativity associated with the aluminum of said framework is satisfied by a cation containing dysprosium or by a combination of cations containing dysprosium and cerium wherein the dysprosium cations comprise at least 60% of the charge associated with said combination.

3. Zeolite according to claim 1 wherein said zeolite is analyzed by ignition at 1800°F., from 1.0 to 6 molecules of water is obtained for each atom of Dy in said zeolite, and wherein said zeolite is crystalline and capable of adsorbing benzene, has an atomic ratio Al/Si of 0.65 to 0.35 and contains at least one Dy $(OH)_2^+$ cation for every 8 atoms of aluminum in the alumino-silicate framework.

4. Zeolite according to claim 1 wherein said aluminosilicate zeolite has an X-ray diffraction pattern which evidences at least some degree of crystallinity and wherein the atomic ratio Al/Si of the alumino-silicate framework of said crystalline portion of said zeolite is from 0.65 to 0.35.

5. The zeolite of claim 1 wherein in the range of 50–70% of the cationic charge necessary for electronic equivalency is satisfied by said dysprosium cations.

6. A Dy alumino-silicate zeolite which is chemically characterized by the formula
$A_1(Na_2O):A_2:A_3(H_2O):c(Dy_{2/3}O):Al_2O_3:e(SiO_2)$
wherein $A_1$ is in the range of 0.01–0.2, $A_2$ is in the range of 0.0–0.3 $c$ is in the range of 0.5–0.7 and $e$ is in the range of 4.5–5.0, the sum of $A_1+A_2+A_3+c+e$ being in the range of 0.9–1.0 and wherein the balance of the cations, if necessary, for electronic equivalency of said zeolite comprise cations of metals, metal oxides or metal hydroxides other than $Na^+$, $NH_4^+H^+$ or cations of dysprosium, and wherein said zeolite has not been contacted with steam at a temperature above 1150°F.

7. The zeolite of claim 6 wherein $A_2$ is in the range of 0.001–0.015 and at least 1.0 molecules of water is obtained for each atom of Dy in said zeolite on ignition analysis at 1800°F., said zeolite being useful as a catalyst for hydrocarbon conversion reactions.

8. The zeolite of claim 6 wherein when said zeolite is analyzed by ignition at 1800°F., at least 1.5 molecules of water is obtained for each Dy atom in said zeolite.

9. The zeolite of claim 6 wherein said zeolite has an X-ray diffraction pattern which evidences at least some degree of crystallinity.

10. The zeolite of claim 8 wherein said zeolite is at least 50% crystalline by X-ray analysis.

11. The zeolite of claim 10 and having a weight loss of at least 3% when analyzed by ignition at 1800°F.

12. The zeolite of claim 6 wherein $A_3$ is in the range of 0.0–0.5.

* * * * *